(12) United States Patent
Villa et al.

(10) Patent No.: US 11,410,252 B2
(45) Date of Patent: Aug. 9, 2022

(54) DISTRIBUTED WEIGHT MEASUREMENT USING INTEGRATED LOAD CELLS

(71) Applicant: Joby Aero, Inc., Santa Cruz, CA (US)

(72) Inventors: Ian Andreas Villa, San Francisco, CA (US); Philipp Haban, Pittsburgh, PA (US)

(73) Assignee: Joby Aero, Inc., Santa Cruz, CA (US)

( * ) Notice: Subject to any disclaimer, the term of this patent is extended or adjusted under 35 U.S.C. 154(b) by 0 days.

(21) Appl. No.: 16/898,076

(22) Filed: Jun. 10, 2020

(65) Prior Publication Data

US 2020/0387989 A1 Dec. 10, 2020

Related U.S. Application Data

(60) Provisional application No. 62/859,469, filed on Jun. 10, 2019.

(51) Int. Cl.
| | |
|---|---|
| *G06Q 10/06* | (2012.01) |
| *B64D 45/00* | (2006.01) |
| *G06Q 50/14* | (2012.01) |
| *B64C 29/00* | (2006.01) |
| *G01G 19/12* | (2006.01) |
| *G06Q 10/02* | (2012.01) |

(Continued)

(52) U.S. Cl.
CPC ............ *G06Q 50/14* (2013.01); *B64C 29/00* (2013.01); *B64D 45/00* (2013.01); *G01G 19/12* (2013.01); *G06Q 10/02* (2013.01); *G06Q 10/06312* (2013.01); *G06Q 50/28* (2013.01); *G06Q 50/30* (2013.01); *B64D 2045/007* (2013.01)

(58) Field of Classification Search
CPC ........ G06Q 50/14; G06Q 50/28; G06Q 50/30; G06Q 10/02; G06Q 10/06312; B64C 29/00; B64D 45/00; B64D 11/00–0698; G01G 19/12; G01C 21/3423
See application file for complete search history.

(56) References Cited

U.S. PATENT DOCUMENTS

| | | | |
|---|---|---|---|
| 9,626,857 B2 * | 4/2017 | Fokkelman | G06Q 10/083 |
| 10,207,805 B2 * | 2/2019 | Evans | B64D 1/22 |

(Continued)

FOREIGN PATENT DOCUMENTS

| | | |
|---|---|---|
| WO | WO-2018132088 A1 | 7/2018 |
| WO | WO-2019089677 A1 | 5/2019 |

(Continued)

OTHER PUBLICATIONS

You Can Be Too Skinny To Fly the F-35, By Eric Tegler, Nov. 3, 2015 (Year: 2015).*

(Continued)

*Primary Examiner* — George Chen
*Assistant Examiner* — Brian Adams Heflin
(74) *Attorney, Agent, or Firm* — Dority & Manning, P.A.

(57) ABSTRACT

Disclosed herein are systems and methods for planning a multimodal itinerary. The systems and methods may include receiving a transportation request. The transportation request may include a starting location, a final destination, and an estimated payload data. During a first leg of the multimodal itinerary, an updated payload data may be received. An aerial vehicle may be assigned to a subsequent leg of the multimodal itinerary based on the updated payload data.

18 Claims, 7 Drawing Sheets

(51) Int. Cl.
  *G06Q 50/28* (2012.01)
  *G06Q 50/30* (2012.01)

(56) References Cited

U.S. PATENT DOCUMENTS

| | | | |
|---|---|---|---|
| 10,304,344 B2* | 5/2019 | Moravek | G01C 21/20 |
| 10,593,217 B2* | 3/2020 | Shannon | G08G 5/0043 |
| 2003/0052799 A1* | 3/2003 | Weigl | B64D 45/0031 340/945 |
| 2015/0120097 A1* | 4/2015 | Hathaway | H04L 67/12 701/14 |
| 2015/0241295 A1* | 8/2015 | Fuscone | B64D 45/00 701/124 |
| 2015/0279217 A1* | 10/2015 | Chen | G06Q 10/0631 701/123 |
| 2017/0106981 A1* | 4/2017 | Bolukbasi | B60R 21/015 |
| 2017/0116617 A1* | 4/2017 | Nance | G06Q 30/018 |
| 2017/0019771 A1 | 7/2017 | Ma | |
| 2017/0197710 A1* | 7/2017 | Ma | B64C 29/0025 |
| 2017/0315014 A1* | 11/2017 | Regan | G01M 1/125 |
| 2018/0308366 A1 | 10/2018 | Goel et al. | |
| 2019/0005441 A1* | 1/2019 | Savian | G06Q 10/087 |
| 2020/0242721 A1* | 7/2020 | Tschechne | G06Q 10/02 |

FOREIGN PATENT DOCUMENTS

| | | |
|---|---|---|
| WO | 2020252030 | 12/2020 |
| WO | 2020252030 A1 | 12/2020 |

OTHER PUBLICATIONS

"A new safety system for eVTOLs uses specialized airbags, a balloon-integrated parachute, and even retro rockets," Transportup: The Latest News for Aerial Mobility, Sep. 26, 2018 (Year: 2018).*
"This is Uber's plan to deliver on flying 'cars'," Megan Rose Dickey, Techcrunch, Feb. 10, 2018 (Year: 2018).*
"How Uber is getting flying cars off the ground," Claire Reilly, Sep. 25, 2018 (Year: 2018).*
"Design and Testing of an Energy-Absorbing Crewseat for the F/FB-111 Aircraft," vol. 1, by Joseph Shane, Aug. 1985 (Year: 1985).*
"Lumbar load attenuation for rotorcraft occupants using a design methodology for the seat impact energy-absorbing system," by Rasoul Moradi, Hamid K Beheshti, Hamid M. Lankarani, Jun. 9, 2012 (Year: 2012).*
"Analysis and Optimization of a Crashworthy Helicopter Seat," by Mhaskar Nauman Hasan Abdul Latif, May 2008 (Year: 2008).*
"International Application Serial No. PCT/US2020/037009, International Search Report dated Sep. 22, 2020", 6 pgs.
"International Application Serial No. PCT/US2020/037009, Written Opinion dated Sep. 22, 2020", 6 pgs.
Uber, "Fast-Forwarding to a Future of On-Demand Urban Air Transportation Introduction", Uber Elevate, (Oct. 27, 2016), 98 pgs.
"European Application Serial No. 20751364.9, Response to Communication Pursuant to Rules 161 and 162 filed Mar. 5, 2021", 15 pgs.
"Australian Application Serial No. 2020293099, First Examination Report dated Feb. 22, 2021", 4 pgs.
"Australian Application Serial No. 2020293099, Response filed Aug. 11, 2021 to First Examination Report dated Feb. 22, 2021", 30 pgs.
"European Application Serial No. 20751364.9, Communication Pursuant to Article 94(3) EPC dated Dec. 13, 2021", 7 pgs.
"International Application Serial No. PCT US2020 037009, International Preliminary Report on Patentability dated Dec. 23, 2021", 8 pgs.

* cited by examiner

DISTRIBUTED WEIGHT MEASUREMENT USING INTEGRATED LOAD CELLS

CLAIM FOR PRIORITY

This application claims the benefit of priority of U.S. Provisional Application Ser. No. 62/859,469, filed Jun. 10, 2019, which is hereby incorporated by reference in its entirety.

TECHNICAL FIELD

Embodiments described generally herein relate to aerial vehicles. Some embodiments relate to distributing weight measurement using integrated load cells.

BACKGROUND

Developments in vertical takeoff and landing (VTOL) related technologies have made it possible to build and support an urban VTOL network. VTOL aircraft using electric propulsion may have zero operational emissions and can operate quietly to not contribute to noise pollution, which is caused by traditional types of aircraft such as helicopters and passenger planes. However, challenges remain in creating and operating a VTOL network that offers a practical and safe mode of transportation at scale while also providing a quality user experience.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
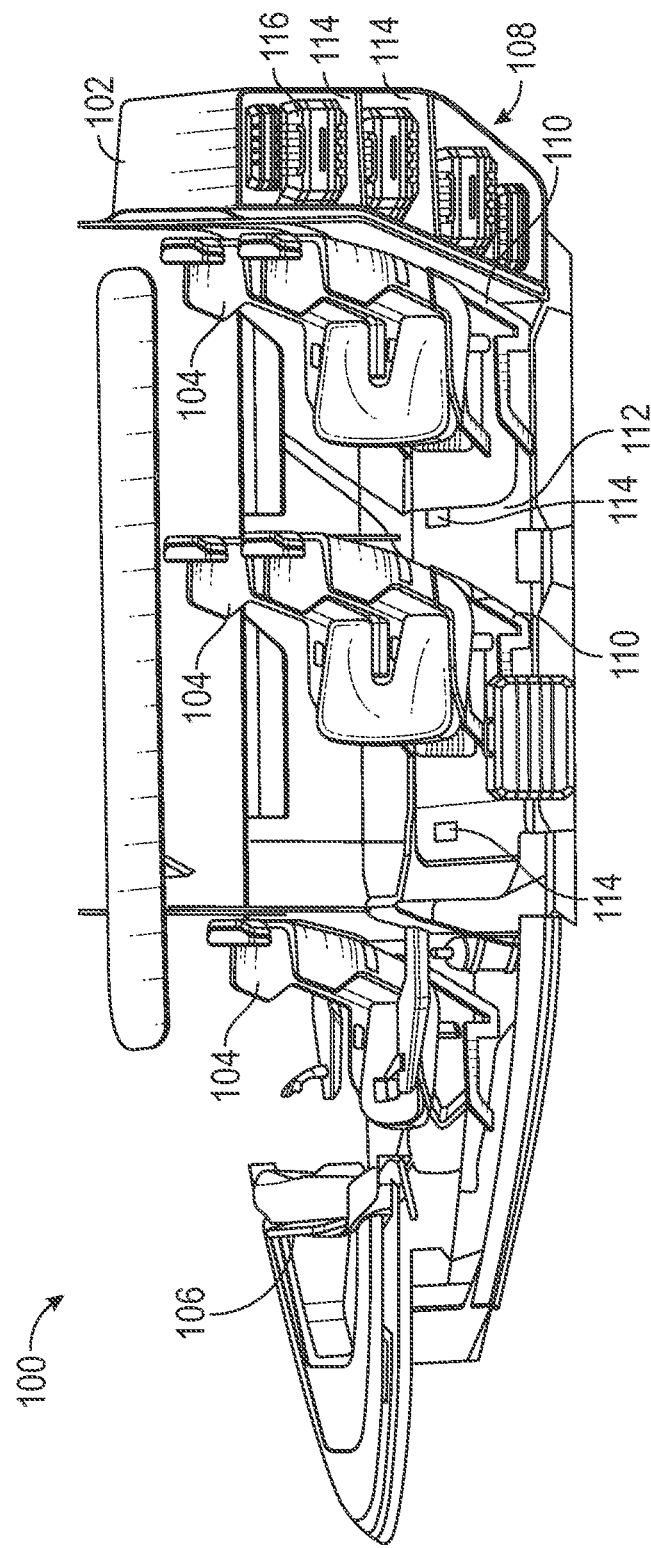
FIG. 1 illustrates an example schematic for an aerial vehicle in accordance with embodiments disclosed herein.

The safety and quality of flights may be dependent on the ability to properly account for and pool people, personal effects (e.g., luggage, belongings, etc.), food, and other items (e.g., tools, batteries, etc.). Adherence to regulatory and safety needs means vehicle payloads must meet strict weight and volume constraints. To ensure that weight and volume constraints can be achieved before takeoff, increased confidence in weight and volume measurements and/or estimations are needed prior to even arriving at transportation hubs such as ground stations, airports, vertiports, helipads, etc. Once this is known, proper steps can be taken to mitigate the sensitivity to payload placement and better optimize seating and payload location of vehicles.

As disclosed herein, the dynamic reallocation of payload compartments, seats, and seat attachments can be made for safety and ride quality. This may be enabled via distributed weight measurement of passengers, luggage, food, and things via load cells embedded in mixed modalities and transportation hubs.

Accurate weight measurement of passengers may be important to ensure that the safety of stroking for vertical takeoff and landing (VTOL) seats is maintained during passenger itineraries. Seats in VTOL aircraft may be rated to allow for specific stroke at a given payload weight. Knowledge of how an alternate seat cushion may be added/replaced/removed to improve seat stroking in emergency scenarios may benefit the overall safety, quality, and reliability of this nascent transportation mode.

The proper weight and volume measurement of luggage and other personal effects may also be important to ensure that the right aircraft are allocated for an itinerary. For example, a passenger bringing an abnormal sized luggage (e.g., surfboard, golf clubs) may need a vehicle with sufficient payload volume and securing considerations. Additionally, special seat attachments may be added a priori once an itinerary has been defined/allocated and necessary information regarding the riders and other payload have been aggregated.

Distributing these measurements across different portions of the multimodal before loading up the aircraft may allow for multiple opportunities to verify volume/weight and thus improve ride quality and safety.

Before initiating an aerial itinerary, it may be assumed that riders have a profile similar to a passport, ID, or global entry with relevant information for security and flight planning purposes. User luggage/personal effects measurements and off-nominal passenger information may be input via a rider app, a call to a transportation consultant, etc. This may include direct user inputs such as weight measurements and/or luggage size measurements (direct or facilitated by other means like augmented reality (AR)). It may also include implicit weight/volume estimations such as, for example, object identification enabled via neural nets.

Once a transportation service is initiated across multiple modalities using rider/payload information paired with aircraft and airspace constraints, touchpoints across the transportation modes leading up to the transportation hubs where the aerial vehicle is located can be identified. These locations may include but are not limited to, the basket of a bike, the trunk of a car, the board of a scooter, and/or the seat of any one of these ground modalities. Load cells properly integrated into these areas may be able to capture weight information. Ultrasonic sensors might also be included to verify if luggage, personal effects, food packages, or other items of payload meets the volumetric constraints of an aircraft/drone.

Once these measurements are made and the ground vehicle and/or if rider/courier can verify that the measurements are valid, the payload data can be relayed back to backend system, which may refine or reaffirm that the itinerary is still well conceived. If new information indicates that the itinerary needs to be modified, the backend system may determine an updated multimodal itinerary that would then be relayed to the rider via their app.

Once weight/volume data is processed by the backend system and the itinerary is updated accordingly, proper steps can be made for each aircraft/drone to improve the rider experience or the transportation of cargo.

As disclosed herein, seat cushions of various weights may be prepared by attendants at ground stations prior to passenger boarding to allow for each designated passenger to improve seat stroking. For example, specialty seats for kids/toddlers or ADA compliance for special needs/edge cases may be installed prior to the passengers' arrival. Attachment or adjustment of new/existing payload bays/compartments for luggage, personal effects, food, other payload may also be performed prior to the passengers' arrival. All of these actions again could be manual or automated.

Turning now to the figures, FIG. 1 illustrates an example schematic of aerial vehicle 100 in accordance with some embodiments. Aerial vehicle 100 may include VTOLs, drones, helicopters, airplanes, and other vehicles capable of flight that are either manned or unmanned. As shown in FIG. 1, aerial vehicle 100 may include an airframe 102, one or more seats 104, and an onboard computer 106.

Airframe 102 may define a cargo compartment 108. Cargo compartment 108 may be where cargo such as packages, luggage, freight, etc. can be stored. Airframe 102 may also define passenger compartment 110 where seats 104 are located. Also, while FIG. 1 shows both a cargo compartment 108 and passenger compartment 110, airframe 102 may have only a cargo comport or only a passenger compartment. In instances where airframe 102 has only a passenger compartment, any luggage passengers may have may be stored on a floor 112. Floor 112 may include one or more load cells 114. Cargo compartment 108 may include load cells 114.

Load cells 114 may be used to obtain and actual weight of luggage 116. As disclosed herein, the actual weight of luggage 116 can be used to confirm estimated weights of luggage 116 provided by a passenger. Load cells 114 can also be used to determine the location of luggage 116. For example, if a piece of luggage 116 has an estimated or confirmed actual weight of X pounds and is supposed to be located in cargo compartment 108, but a load cell in passenger compartment 110 detects an item having an actual weight of X pounds then it may be assumed that the piece of luggage 116 was placed in passenger compartment 110 instead of cargo compartment 108. The actual weight of the piece of luggage may have been confirmed by a baggage handler or other personnel before being placed inside aerial vehicle 100.

Figure 2A:
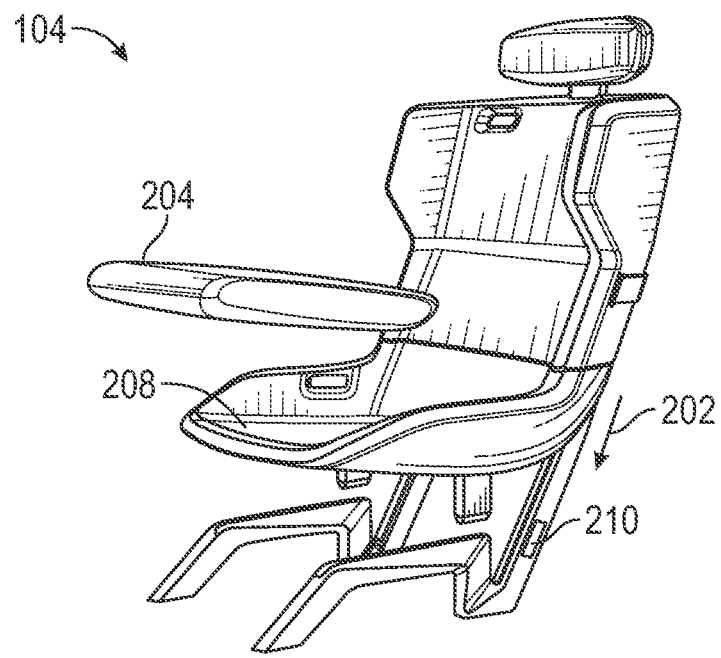
FIGS. 2A and 2B each illustrates an example seat of the aerial vehicle in FIG. 1 in accordance with embodiments disclosed herein.
Figure 2B:
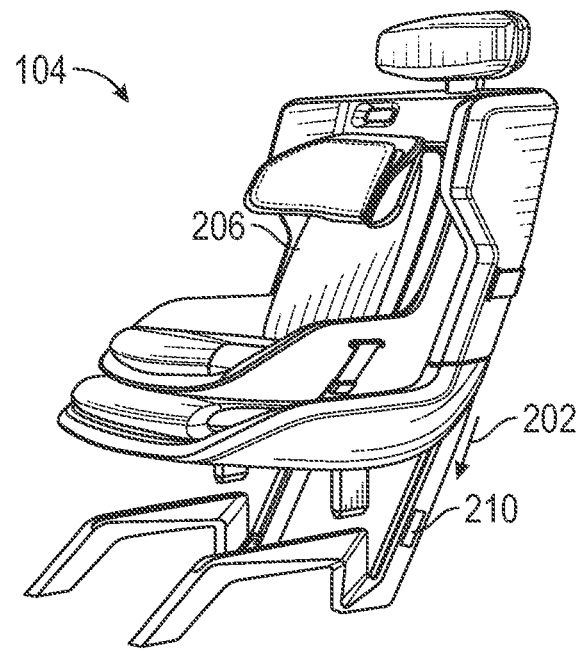

FIGS. 2A and 2B each illustrates an example seat 104 of aerial vehicle 100 in accordance with embodiments disclosed herein. Seat 104 may have stroke, which refers to deflection in a vertical direction as indicated by arrow 202. Seat 104 may include springs, shocks, crumple zones, etc. that allow seat 104 to deflect as indicated by arrow 202. The deflection allows seat 104 to absorb some of the forces caused in the event of a hard landing. Stated another way, the deflections allow seat 104 to lower the deceleration of a passenger seated in seat 104 in the event of a hard landing.

The amount of deflection may be a function of multiple factors. For example, the amount of deflection may be a function of the weight of an occupant (e.g., the passenger) and the deceleration experienced during a hard landing. For example, seat 104 may be designed using an estimated weight for passengers. The estimated weight may be an average weight for adult males, females, children, the population as a whole, etc. The shocks, springs, or other impact absorbing elements of seat 104 may be designed such that for a person of X pounds, or within a range of X pounds, seat 104 will deflect a distance Y.

If the passenger does not weight X pounds or is not within the range of X pounds, seat 104 may not deflect distance Y. For example, if the passenger weighs more than X pounds seat 104 may want to deflect a distance greater than distance Y. In such a case, seat 104 may bottom out or reach the bottom of the stroke. Upon bottoming out, seat 104 may no longer be able to absorb energy. If the passenger weighs less than X pounds seat 104 may not deflect the full distance Y, or just short of the full distance Y. As a result, the passenger may not benefit from a slowed deceleration because instead of seat 104 absorbing the impact, the shock absorbing component of seat 104 may transfer energy from airframe 102 to the passenger via seat 104.

Because each passenger does not weigh the same amount, seat 104 may be customized based on a passenger's weight. For example, an attachment 204 or 206 may be added to or removed from seat 104 to increase or decrease the weight seat 104 supports.

As shown in FIG. 2A, attachment 204 may be a cushion or other article that is placed in or removed from a seat portion 208. Attachment 204 may be selected from a plurality of attachments. Each of the plurality of attachments may have a different weight. Depending on the weight of a passenger, attachment 204 may be selected so that the weight of the passenger plus the weight of attachment 204 is equal to X pounds or is within a predetermined range.

As shown in FIG. 2B, attachment 206 may be a supplemental seat (e.g., a booster seat, a car seat, etc.) that is placed in or removed from seat portion 208. Just as with attachment 204, attachment 206 may be selected from a plurality of attachments. Each of the plurality of attachments may have a different weight. For example, depending on the weight of a child passenger, attachment 206 may be selected so that the weight of the child passenger plus the weight of attachment 206 is equal to X pounds or is within the predetermined range. Using a known age of a child, an initial estimate of a weight for attachment 206 needed to equal X pounds or with the predetermined range can be made and confirmed once an actual weight of the child is known.

Seat 104 may also include one or more load cells 210. Load cell 210 may be used to confirm the weight supported by seat 104. Load cell 210 may be me in electrical communication with onboard computer 106. As such, load cell 210 may transmit signal to and receive signals from onboard computer 106.

The signals may include data that correlates to a weight. For example, load cell 210 may be a strain gauge or other device that may produce a voltage. The voltage may be proportional or otherwise related to the strain produced by the weight of the passenger and the attachment 204 or 206.

Load cells 114 may also be in electrical communication with onboard computer 106 and may produce a voltage or other signal similar to load cell 210. Thus, using load cells 114, onboard computer 106 may determine an actual weight of luggage 116 or other items on the floor of passenger compartment 110. The weight determined by onboard computer 106 may be used to confirm an estimated weight of luggage 116 or other items on the floor of passenger compartment 110. In addition, load cells 114 may be used to determine if luggage 116 is stored in a proper location. For example, a load planner may assign a particular location within cargo compartment 108 for luggage 116. If luggage 116 is stowed in a different location, the lack of weight or an incorrect weight detected using load cells 114 may trigger an indication displayed by onboard computer 106. The indication may be visual and/or audible to alert ground crew members or a pilot of aerial vehicle 100.

Figure 3:
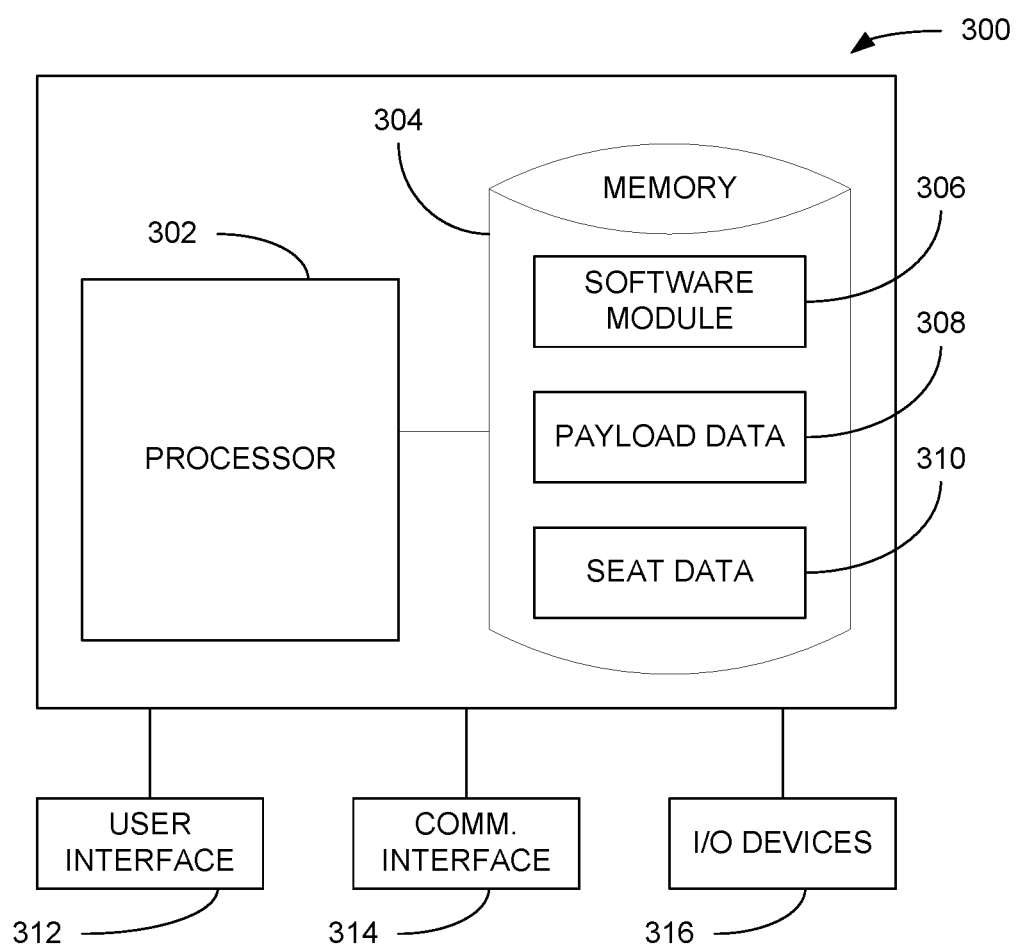
FIG. 3 illustrates an example schematic of a computing device in accordance with embodiments disclosed herein.

FIG. 3 shows an example schematic of a computing device 300, such as onboard computer 106 or a remote computer that may be used to do initial load planning, assign seats, etc. As shown in FIG. 3, computing device 300 may include a processor 302 and a memory unit 304. Memory unit 304 may include a software module 306, payload data 308, and seat data 310. While executing on processor 302, software module 306 may perform processes for ensuring proper seat stroking for a seat, such as seat 104, including, for example, one or more stages included in methods 400 and 700 described below with respect to FIGS. 4 and 6.

Computing device 300 may include a user interface 312. User interface 312 may include any number of devices that allow a user to interface with computing device 300. Non-limiting examples of the user interface 312 include a keypad, a keyboard, a joystick, a display (touchscreen or otherwise), etc.

Computing device 300 may include a communications interface 314. Communications interface 314 may allow computing device 300 to communicate with a remote computer when computing device 300 is onboard computer 106 or with onboard computer 106 when computing device 300 is a remote computer. Non-limiting examples of the communications interface 314 include ADS-B In/Out modules, cellular modules, Ethernet cards (wireless or wired), Bluetooth® transmitters and receivers, near-field communications modules, etc. For example, communications interface 314 may include an automatic dependent surveillance-broadcast (ADS-B) receiver (ADS-B In) or transmitter (ADS-B Out) that may send and receive data. In addition, communications interface 314 may include a cellular interface or other wireless communications system. For example, communications interface 314 may include an ADS-B In and Out module that allows aerial vehicle 100 to transmits its position to air traffic control (ATC) facilities and also allow aerial vehicle 100 to receive traffic advisories from ATC facilities in addition to transmitting and receiving payload data 308, such as passenger and cargo information.

Computing device 300 may include one or more input/output (I/O) devices 316. I/O device 316 may allow computing device 300 to receive and output information. Non-limiting examples, of I/O device 316 may include load cells, accelerometers, gyros, magnetometers, and other data collection sensors that may be part of aerial vehicle 100 and used to detect an actual weight of passengers or cargo as disclosed herein.

Payload data 308 may include data supplied by a passenger or entered by ground personnel. For example, payload data 308 may include a passenger's weight, height, the estimated weight and dimensions of any luggage or cargo the passenger wishes to bring with him or her on a flight, HAZMAT information for the cargo, etc. Payload data 308 may also include data provided by the manufacture of aerial vehicle 100. For example, payload data 308 may include maximum floor loading limits, restrictions on HAZMAT cargo, weight distribution guidelines or restrictions, etc. For instance, payload data 308 may include formulas for calculating a center of gravity (CG) for aerial vehicle 100 as well as guidance for distributing passengers and cargo for optimizing the CG of aerial vehicle 100.

Seat data 310 may include data supplied by the manufacture of seat 104 and/or aerial vehicle 100. For example, seat data 310 may include mathematical formulas or a collection of lookup tables that may be used to determine an actual weight of passengers or cargo using signals, such as voltages, supplied by load cells 114 and 210. Seat data 310 may also include weight restrictions and a prescribed weight for seat 104 to obtain specific seat stroking. For example, each seat in aerial vehicle 100 may be different and have a different prescribed weight to obtain specific seat stroking. Thus, computing device 300 may use seat data 310 to assign seats to passengers based on payload data 308. For instance, computing device 300 may assign seat A to a passenger that has a weight that is within a prescribed weight range for seat A so that an attachment, such as attachment 204 is not needed. Seat data 308 may indicate that attachment 204 is already installed in seat B and will not need to be removed is passenger B' sits in seat B.

Figure 4:
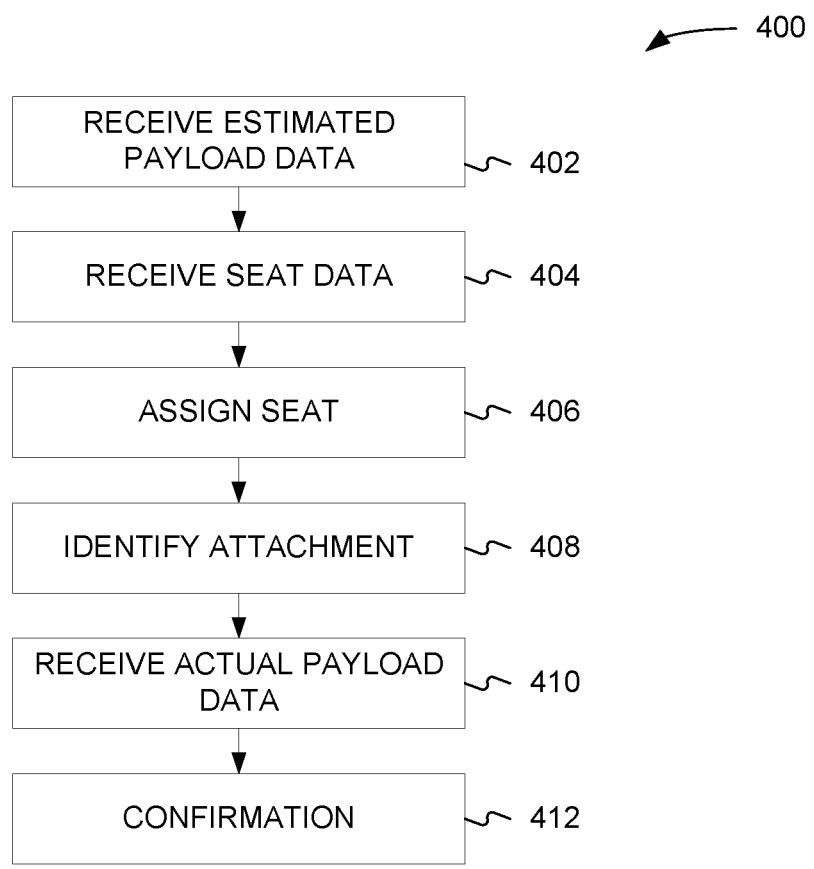
FIG. 4 illustrates an example method in accordance with embodiments disclosed herein.

FIG. 4 illustrates an example method 400 in accordance with some embodiments disclosed herein. The method 400 may include receiving payload data (402), such as payload data 308. The payload data may be received at a computing device, such as computing device 300. The payload data received may include estimates for cargo. For example, the payload data received may include estimated weights and dimensions of luggage or other cargo to be transported. The payload data received may also include an estimated number of passengers and weights of the passengers. As disclosed herein, the estimated payload data may be received before passengers arrive at a transportation hub to board an aerial vehicle. By receiving the payload data before the passengers arrive, seats on the aerial vehicle may be configured before the passengers arrive to minimize delays. In addition, by receiving the payload data before the passengers arrive at the transportation hub, assignment of vehicles, aerial or ground, can be selected for various legs of a multimodal trips.

Method 400 may also include receiving seat data (404). For example, a remote computer, such as computing device 300 may receive seat data from an onboard computer, such as onboard computer 106 of aerial vehicle 100. As disclosed herein, the seat data received may include information about the number of seats in aerial vehicle 100, any attachments 204 or 206 that may be attached to seats, weights needed to achieve a specific stroke for each seat, etc.

Once the payload data and seat data have been received, seats may be assigned (406). For example, the weights of passengers may be matched to seats. For instance, passengers may be distributed to achieve an approximately equal weight distribution throughout aerial vehicle. Passengers may be assigned to seats that have attached already installed to have a weight within a weight range needed for specific seat stroking. By matching passengers to seats that already have attachments installed, downtime may be avoided due to not needed to reconfigure seats. Assigning seats may also include assigning cargo such as luggage or other items being shipped to a location within cargo compartment 108 or passenger compartment 110.

Once seats are assigned, attachments, such as attachments 204 and 206 may be identified (408). For example, once passengers are assigned seats, the passenger may not weigh enough to achieve specific seat stroking. As a result, computing device 300 may identify an attachment that can be attached to seat 104 to bring the weight of the passenger plus the attachment to within a weight range needed to achieve specific seat stroking.

In addition to adding an attachment to a seat, computing device 300 may identify an attachment that may need to be removed from a seat. For instance, if an attachment is already attached to a seat and the combined weight of the attachment and the passenger is greater than a prescribed weight then the attachment may be identified for removal.

Once the passengers are seated and the cargo stowed, actual payload data may be received (410). For example, once the passengers are seated, load cells attached to the seats may transmit signals to computing device 300. Still consistent with embodiments disclosed herein, actual payload data may be confirmed by ground personnel, a pilot, and/or the passenger. For instance, the passenger may confirm his or her weight via a mobile app on his or her phone. Ground personal may ask a passenger to confirm his or her weight and may enter it directly into computing device 300. Ground personal may also enter the dimension of cargo/luggage and that the cargo/luggage is stored in the proper location. Still further, while walking to aerial vehicle 100, passengers may walk across load cells located on the tarmac, which in turn may transmit signals to computing device 300.

Once the actual payload data has been received, computing device 300 may confirm the attachment to be attached to or removed from the seat (412). For example, if the estimated payload data and the actual payload data are approximately the same, the computing device 300 may confirm that the attached identified at stage 408 is to be added to or removed from the seat.

In addition, confirmation may also include using the actual payload data received in stage 410 to confirm that luggage/cargo are stored in the assigned locations and that passengers are seated in their assigned seats. Once the confirmation is completed, ground personnel may attach or remove the attachment from the seats as needed.

Figure 5:
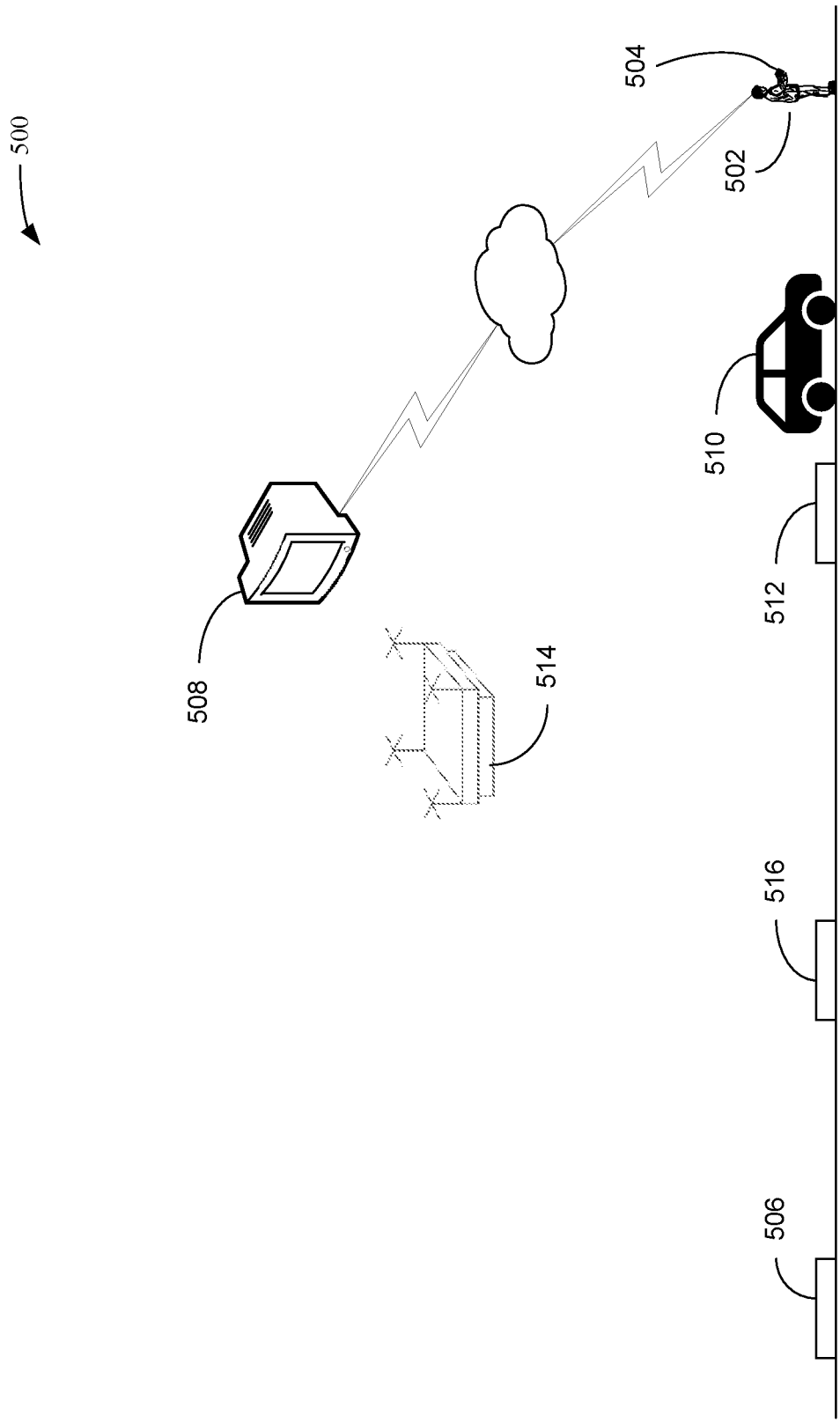
FIG. 5 illustrates an example schematic for a multimodal itinerary in accordance with embodiments disclosed herein.

Turning now to FIG. 5, FIG. 5 illustrates an example schematic for a multimodal itinerary in accordance with embodiments disclosed herein. As shown in FIG. 5, a user 502 may use a mobile device 504 to plan the multimodal itinerary that transports user 502 from his or her current location to a final destination 506. Planning the multimodal itinerary may include user 502 entering a starting location (e.g., his or her present location) and final destination 506 using mobile device 504. Mobile device 504 may select segments for each leg of the itinerary. Mobile device 504 may also transmits the starting location and final destination 506 to a remote computer 508. Remote computer 508 may select segments for each leg of the itinerary.

Selecting legs of the itinerary may include select various modes of transportation for one or more legs of the itinerary. For instance, as disclosed herein, a first leg of the itinerary may include use of a ground transportation 510 (e.g., a car, scooter, or other mode of ground transportation) to carry user 502 from his or her current location to a first transportation hub 512. A second leg of the itinerary may include taking a VTOL 514, such as aerial vehicle 100, from first transportation hub 512 to a second transportation hub 516. From second transportation hub 516, user 502 may walk or use another form of transportation such as a car, scooter, etc., to final destination 506. Transportation hubs 512 and 516 may include skyports, heliports, vertiport, or other locations where VTOL 514 can take off and land.

As disclosed herein, ground transportation 510 may allow for volumes and weights of passengers and their luggage or other personal items or cargo that may be transported from user 502's current location to final destination 506. Also, user 502 need not accompany cargo that may be transported from first transportation hub 510 to final destination 506.

Ground transportation 510 may include load cells, cameras, LIDAR, or other sensors that may be used to obtain weight and volume of passengers, luggage, personal items, cargo, or other items of payload. For example, ground transportation 510 may be an automobile that includes load cells associated with seats and cargo compartments of the automobile. For instance, the bed of a trunk may include one or more load cells that can obtain the weight of cargo. Seats in the automobile may also have load cells that can obtain weights of passengers. The weights may be transmitted to remote computer 508 for selecting appropriate modes of transportation or legs for the multimodal itinerary. As another example, user 502 may travel via scooter or bicycle and the scooter or bicycle may have load cells placed on seat posts and/or baskets that may be used to hold cargo of user 502. The load cells and other sensors on scooter or bicycle may allow for weights of user 502 and user 502's cargo prior to user 502 arriving at first transportation hub 512.

Also, cameras located inside the passenger compartment of the automobile and trunk may be used to obtain dimensions for luggage, personal items, or other cargo (i.e., payload items). The cameras may use augmented reality (AR) or other technology to estimate dimensions for payload items. For example, features of the automobile may have a known dimension and image analysis may be used to obtain dimensions of payload items. User 502 may also use AR capabilities of mobile device 504 to obtain estimated dimensions of payload items.

First transportation hub 512 may also include load cells and cameras or other sensors to obtain weights and dimensions of passengers and payload. For example, to board VTOL 514, user 502 may have to walk through a gate. Located proximate the gate may be load cells and a camera to capture images of payload items. As a result, once user 502 scans a barcode, other boarding document, or a beacon such as a Bluetooth beacon identifies user 502, a weight detected by the load cells and camera proximate the gate can be used to confirm the estimated weights and dimensions of the passenger and other payload data previously received.

Figure 6:
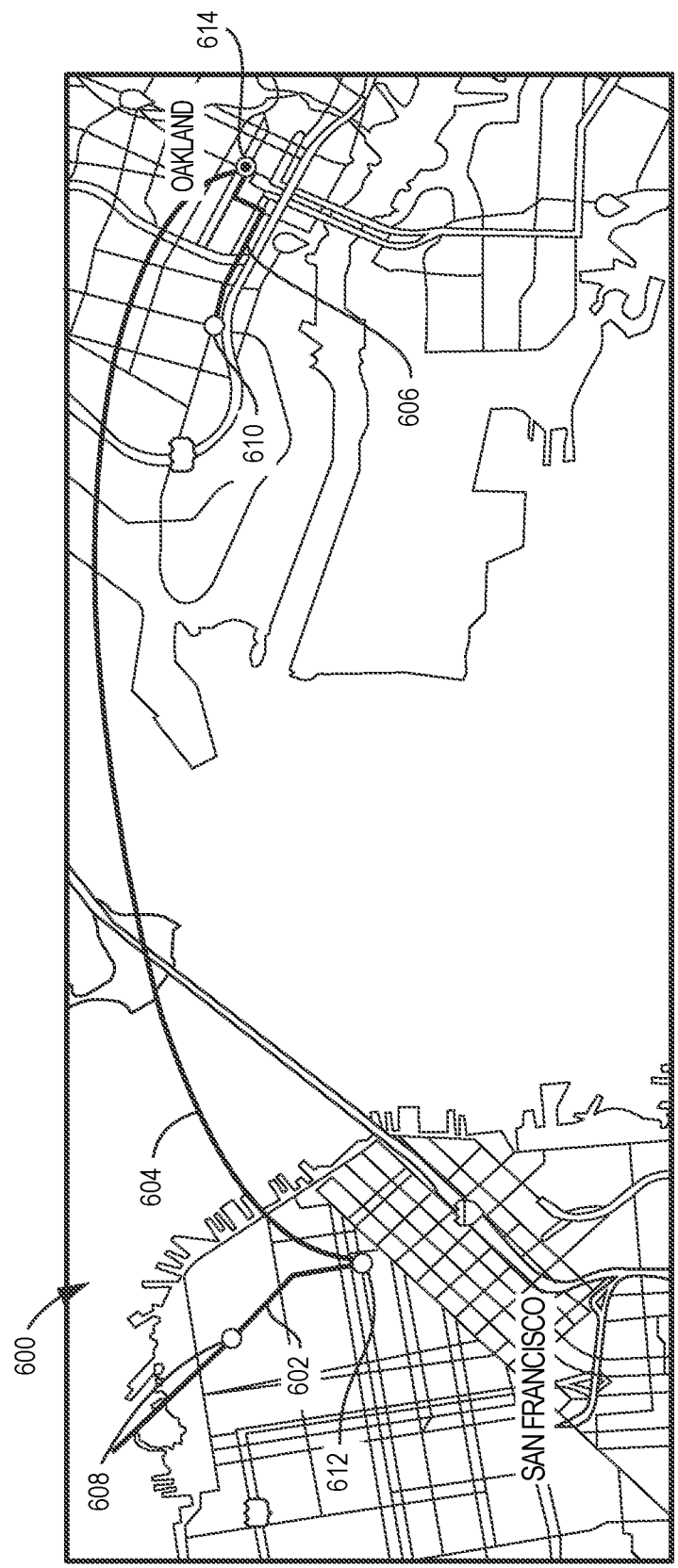
FIG. 6 illustrates a schematic geographic overhead view of the multimodal itinerary in accordance with embodiments disclosed herein.

FIG. 6 illustrates an example schematic geographic overhead view of a multimodal itinerary 600 in accordance with embodiments disclosed herein. Multimodal itinerary 600 may include a first leg 602, a second leg 604, and a third leg 606 from a starting location 608 to a destination location 610. As shown in FIG. 6, a user may travel from starting location 608 to a first transportation hub 612 and take an aerial vehicle to a second transportation hub 614. FIG. 6 shows an example itinerary where a user may want to travel from a location in San Francisco to a location in Oakland. During first leg 602, payload data may be obtained via load cells in preparation for second leg 604 as disclosed herein.

Figure 7:
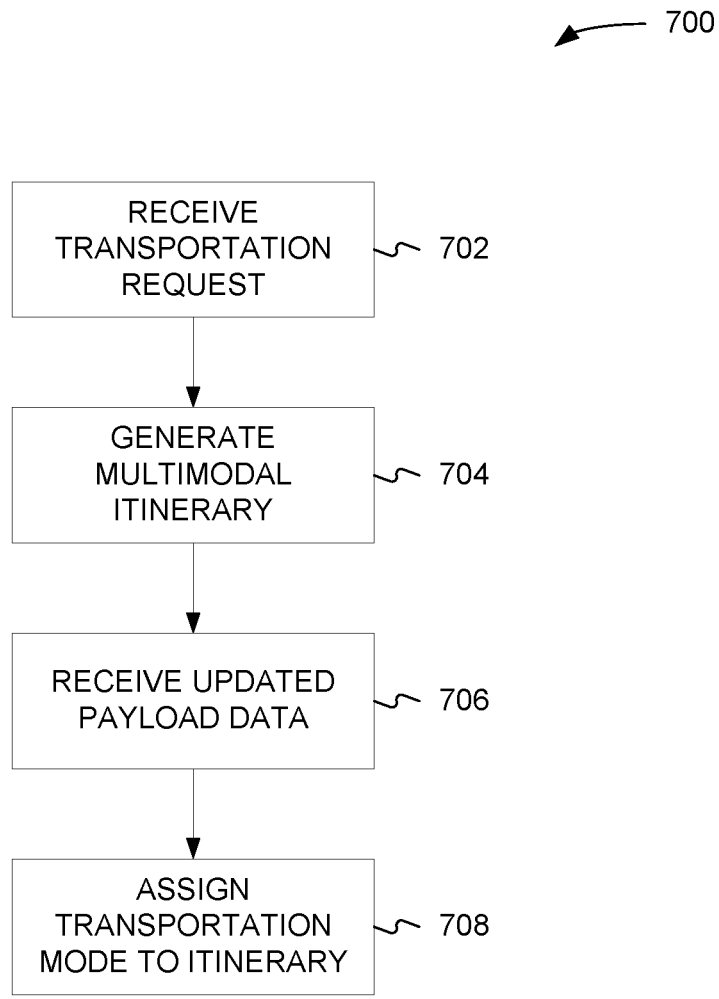
FIG. 7 illustrates an example method in accordance with embodiments disclosed herein.

FIG. 7 illustrates an example method 700 in accordance with embodiments disclosed herein. Method 700 may be for planning a multimodal itinerary. Method 700 may include receiving a transportation request (702). The transportation request may include a starting location, a final destination, such as final destination 506, and an estimated weight for a payload. As disclosed herein, the transportation request may be received from a mobile device, such as mobile device 504. The transportation request may be received at a remote computer such as remote computer 508.

Once the transportation request is received, a multimodal itinerary may be generated (704). The multimodal itinerary may include multiple legs as described herein. For example, the multimodal itinerary may include a first leg that is accomplished via a ground transportation mode of transportation and a second leg that includes an aerial mode of transportation.

During the first leg of the multimodal itinerary, updated payload data may be received (706). For instance, an updated estimated weight for the payload and updated volume data may be received. For example, as disclosed herein, load cells and cameras in the mode of transportation may be used to obtain weights/volume data for the passenger and/or payload. The signals from load cells may be transmitted to onboard computers of the ground transportation transporting the passenger or cargo, which may in turn transmit the data to remote computers.

Using the updated payload data, an aerial vehicle may be assigned to a subsequent leg of the multimodal itinerary (708). Assigning the aerial vehicle may include rerouting an aerial vehicle to a transportation hub associated with the subsequent leg. Assigning the aerial vehicle may include rerouting a passenger to a transportation hub associated with the subsequent leg. By assigning the aerial vehicle to the itinerary or rerouting a passenger may allow for the aerial vehicle to be configured as disclosed herein with proper seat attachments for a desired seat stroke. In addition, it may payload to be assigned to vehicles that can accommodate the payload. For example, assigned the aerial vehicle to the itinerary can help assure that a cargo area of the aerial vehicle has a appropriate size to hold the cargo.

Additional Notes & Examples

Example 1 is a method for ensuring proper seat stroking for a seat of a vertical takeoff and landing (VTOL) vehicle, the method comprising: receiving, at a computing device comprising a processor, an estimated weight of a payload; receiving, at the computing device, seat data for the seat, the seat data including a specific weight to achieve a specific stroke for the seat; and identifying an attachment to be added to or removed from the seat using a combined weight of the payload and a weight of the attachment is within a predefined range of the specific weight to achieve the specific stroke.

In Example 2, the subject matter of Example 1 optionally includes receiving, at the computing device, an actual weight the payload; and confirming the attachment to be added to or removed from the seat based on the actual weight of the payload.

In Example 3, the subject matter of Example 2 optionally includes wherein receiving the actual weight comprises receiving the actual weight from a load cell attached to the seat of the VTOL vehicle.

In Example 4, the subject matter of any one or more of Examples 2-3 optionally include wherein receiving the actual weight comprises receiving the actual weight from a load cell attached to a floor panel of the VTOL vehicle.

In Example 5, the subject matter of any one or more of Examples 1-4 optionally include adding or removing the attachment from the seat.

In Example 6, the subject matter of any one or more of Examples 1-5 optionally include wherein the payload is a passenger and the method further comprising assigning the seat to the passenger.

In Example 7, the subject matter of Example 6 optionally includes verifying the passenger sits in the seat.

Example 8 is a system for planning placement of a payload within a vertical takeoff and landing (VTOL) vehicle, the system comprising: a processor; and a memory including instructions that, when executed by the processor, cause the processor to perform actions comprising: receiving an estimated weight of the payload, receiving seat data for a seat of the VTOL vehicle, the seat data including a specific weight to achieve a specific stroke for the seat, and determining that an attachment is to be added to or removed from the seat based on the estimated weight of the payload transgressing a threshold.

In Example 9, the subject matter of Example 8 optionally includes wherein the determining comprises calculating a combined weight using the estimated weight of the payload and a weight of the attachment.

In Example 10, the subject matter of any one or more of Examples 8-9 optionally include wherein the actions further comprise: receiving an actual weight for the item of the payload; and confirming the attachment to be added to or removed from the seat based on the actual weight of the payload.

In Example 11, the subject matter of Example 10 optionally includes wherein receiving the actual weight comprises receiving the actual weight from a load cell attached to the seat of the VTOL vehicle.

In Example 12, the subject matter of any one or more of Examples 10-11 optionally include wherein receiving the actual weight comprises receiving the actual weight from a load cell attached to a floor panel to which the seat is attached.

In Example 13, the subject matter of any one or more of Examples 8-12 optionally include wherein the payload includes a passenger and luggage of the passenger, the actions further comprising assigning the seat to the passenger and assigning a location within the VTOL vehicle for the luggage.

In Example 14, the subject matter of Example 13 optionally includes wherein the actions further comprise verifying the passenger sits in the seat and the luggage is stowed in the location within the VTOL vehicle.

In Example 15, the subject matter of any one or more of Examples 13-14 optionally include wherein the actions further comprise receiving an estimated volume of the luggage and assigning the location for the luggage includes utilizing the estimated volume to assign the location.

In Example 16, the subject matter of Example 15 optionally includes wherein the actions further comprise: receiving an actual volume for the luggage; and confirming the luggage fits in the location within the VTOL vehicle based on the actual volume.

Example 17 is a vertical takeoff and landing (VTOL) vehicle comprising: a processor; a seat; and a memory including instructions that, when executed by the processor, cause the processor to perform actions comprising: receiving an estimated weight for a passenger, receiving seat data for the seat, the seat data including a specific weight to achieve a specific stroke for the seat, assigning the seat to the passenger, and determining that an attachment is to be added to or removed from the seat based on the estimated weight of the passenger transgressing a threshold.

In Example 18, the subject matter of Example 17 optionally includes wherein the actions further comprise verifying the passenger sits in the seat assigned the passenger.

In Example 19, the subject matter of any one or more of Examples 17-18 optionally include wherein the actions further comprise: receiving a signal from a load cell, the signal corresponding to an actual weight of the passenger; and confirming the attachment to be added to or removed from the seat based on the actual weight of the passenger.

In Example 20, the subject matter of any one or more of Examples 17-19 optionally include wherein the actions further comprise: receiving an estimated volume of luggage for the passenger; assigning a location for the luggage within the VTOL vehicle utilizing the estimated volume of the luggage; receiving an actual volume for the luggage; and confirming the luggage fits in the location within the VTOL vehicle based on the actual volume.

In Example 21, the subject matter of Example 20 optionally includes wherein receiving the actual weight comprises receiving the actual weight for the luggage from a load cell attached to a floor panel of the VTOL vehicle.

Example 22 is a method for planning a multimodal itinerary, the method comprising: receiving a transportation request, the transportation request include a starting location, a final destination, and an estimated payload data; receiving, during a first leg of the multimodal itinerary, an updated payload data; and assigning an aerial vehicle to a subsequent leg of the multimodal itinerary based on the updated payload data.

In Example 23, the subject matter of Example 22 optionally includes wherein receiving the updated payload data includes receiving the updated payload data from a load cell associated with a ground transportation used for the first leg of the multimodal itinerary.

In Example 24, the subject matter of any one or more of Examples 22-23 optionally include wherein assigning the aerial vehicle to the subsequent leg of the multimodal itinerary includes rerouting an aerial vehicle to a transportation hub associated with the subsequent leg.

In Example 25, the subject matter of any one or more of Examples 22-24 optionally include wherein assigning the aerial vehicle to the subsequent leg of the multimodal itinerary includes rerouting a passenger to a transportation hub associated with the subsequent leg.

In Example 26, the subject matter of any one or more of Examples 22-25 optionally include generating seat assignment data based on the updated payload data, the seat assignment data indicating an assigned seat in the aerial vehicle for a passenger that travels along the first leg of the multimodal itinerary.

In Example 27, the subject matter of any one or more of Examples 22-26 optionally include generating compartment assignment data based on the updated payload data, the compartment assignment data indicative of an assigned compartment in the aerial vehicle for luggage that travels along the first leg of the multimodal itinerary.

Example 28 is a system for planning a multimodal itinerary, the system comprising: a processor; and a memory including instructions that, when executed by the processor, cause the processor to perform actions comprising: receiving a transportation request, the transportation request include a starting location, a final destination, and an estimated payload data, receiving, during a first leg of the multimodal itinerary, an updated payload data, and assigning an aerial vehicle to a subsequent leg of the multimodal itinerary based on the updated payload data.

In Example 29, the subject matter of Example 28 optionally includes wherein receiving the updated payload data includes receiving the updated payload data from a load cell associated with a ground transportation used for the first leg of the multimodal itinerary.

In Example 30, the subject matter of any one or more of Examples 28-29 optionally include wherein assigning the aerial vehicle to the subsequent leg of the multimodal itinerary includes rerouting an aerial vehicle to a transportation hub associated with the subsequent leg.

In Example 31, the subject matter of any one or more of Examples 28-30 optionally include wherein assigning the aerial vehicle to the subsequent leg of the multimodal itinerary includes rerouting a passenger to a transportation hub associated with the subsequent leg.

In Example 32, the subject matter of any one or more of Examples 28-31 optionally include wherein the actions further comprise generating seat assignment data based on the updated payload data, the seat assignment data indicating an assigned seat in the aerial vehicle for a passenger that travels along the first leg of the multimodal itinerary.

In Example 33, the subject matter of any one or more of Examples 28-32 optionally include wherein the actions further comprise generating compartment assignment data based on the updated payload data, the compartment assignment data indicative of an assigned compartment in the aerial vehicle for luggage that travels along the first leg of the multimodal itinerary.

In Example 34, the apparatuses, systems, VTOL, or method of any one or any combination of Examples 1-33 can optionally be configured such that all elements or options recited are available to use or select from.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for planning a multimodal itinerary, the method comprising:
   receiving a transportation request, the transportation request including a starting location, a final destination, and estimated payload data;
   receiving, during a first leg of the multimodal itinerary, updated payload data;
   assigning an aerial vehicle to a subsequent leg of the multimodal itinerary based on the updated payload data;
   assigning a seat of the aerial vehicle to a passenger;
   receiving seat data for the seat, the seat data including a specific weight to achieve a specific stroke for the seat;
   calculating a weight difference between the passenger and the specific weight;
   identifying an attachment to be added to or removed from the seat based on the weight difference and a weight of the attachment; and
   adding or removing the attachment from the seat.

2. The method of claim 1, wherein receiving the updated payload data includes receiving the updated payload data from a load cell associated with a ground transportation used for the first leg of the multimodal itinerary.

3. The method of claim 1, wherein assigning the aerial vehicle to the subsequent leg of the multimodal itinerary includes rerouting the aerial vehicle to a transportation hub associated with the subsequent leg.

4. The method of claim 1, wherein assigning the aerial vehicle to the subsequent leg of the multimodal itinerary includes rerouting the passenger to a transportation hub associated with the subsequent leg.

5. The method of claim 1, further comprising generating seat assignment data based on the updated payload data, the seat assignment data indicating an assigned seat in the aerial vehicle for the passenger that travels along the first leg of the multimodal itinerary.

6. The method of claim 1, further comprising generating compartment assignment data based on the updated payload data, the compartment assignment data indicative of an assigned compartment in the aerial vehicle for luggage that travels along the first leg of the multimodal itinerary.

7. The method of claim 1, further comprising:
   receiving an actual weight of a payload associated with the estimated payload data; and
   confirming the attachment to be added to or removed from the seat based on the actual weight of the payload.

8. The method of claim 7, wherein receiving the actual weight comprises:
   receiving the actual weight from a load cell attached to the seat of the aerial vehicle; or
   receiving the actual weight from a load cell attached to a floor panel of the aerial vehicle.

9. The method of claim 1, further comprising verifying the passenger sits in the seat.

10. A system for planning a multimodal itinerary, the system comprising:
    a processor; and
    a memory including instructions that, when executed by the processor, cause the processor to perform actions comprising:
      receiving a transportation request, the transportation request including a starting location, a final destination, and an estimated payload data,
      receiving, during a first leg of the multimodal itinerary, an updated payload data,
      assigning an aerial vehicle to a subsequent leg of the multimodal itinerary based on the updated payload data,
      assigning a seat of the aerial vehicle to a passenger,
      receiving seat data for the seat, the seat data including a specific weight to achieve a specific stroke for the seat,
      calculating a weight difference between the passenger and the specific weight, and
      determining that an attachment is to be added to or removed from the seat based on the weight difference and an estimated weight of the payload transgressing a threshold.

11. The system of claim 10, wherein receiving the updated payload data includes receiving the updated payload data from a load cell associated with a ground transportation used for the first leg of the multimodal itinerary.

12. The system of claim 10, wherein assigning the aerial vehicle to the subsequent leg of the multimodal itinerary includes rerouting the aerial vehicle to a transportation hub associated with the subsequent leg.

13. The system of claim 10, wherein assigning the aerial vehicle to the subsequent leg of the multimodal itinerary includes rerouting the passenger to a transportation hub associated with the subsequent leg.

14. The system of claim 10, wherein the actions further comprise generating seat assignment data based on the updated payload data, the seat assignment data indicating an assigned seat in the aerial vehicle for a passenger that travels along the first leg of the multimodal itinerary.

15. The system of claim 10, wherein the actions further comprise generating compartment assignment data based on the updated payload data, the compartment assignment data indicative of an assigned compartment in the aerial vehicle for luggage that travels along the first leg of the multimodal itinerary.

16. The system of claim 10, wherein the actions further comprise:
    receiving an actual weight for the passenger; and
    confirming the attachment to be added to or removed from the seat based on the actual weight of the passenger.

17. The system of claim 10, wherein the actions further comprise verifying the passenger sits in the seat.

18. The system of claim 10, wherein the actions further comprise:
    receiving an estimated volume of luggage belonging to the passenger;
    assigning a location for the luggage based on the estimated volume to assign the location;
    receiving an actual volume for the luggage; and
    confirming the luggage fits in the location within the aerial vehicle based on the actual volume.

* * * * *